United States Patent [19]
Miyanaga et al.

[11] Patent Number: 6,143,677
[45] Date of Patent: Nov. 7, 2000

[54] SILICON NITRIDE SINTER HAVING HIGH THERMAL CONDUCTIVITY AND PROCESS FOR PREPARING THE SAME

[75] Inventors: Michimasa Miyanaga; Seiji Nakahata; Akira Yamakawa, all of Hyogo, Japan

[73] Assignee: Sumitomo Electric Industries, Ltd., Osaka, Japan

[21] Appl. No.: 09/254,960

[22] PCT Filed: Aug. 31, 1998

[86] PCT No.: PCT/JP98/03878

§ 371 Date: Mar. 22, 1999

§ 102(e) Date: Mar. 22, 1999

[87] PCT Pub. No.: WO99/11583

PCT Pub. Date: Mar. 11, 1999

[30] Foreign Application Priority Data

Sep. 3, 1997 [JP] Japan ..................................... 9-238168

[51] Int. Cl.[7] .......................... C04B 35/583; C04B 35/65
[52] U.S. Cl. ............................. 501/97; 264/647; 264/659
[58] Field of Search ........................ 419/13, 20; 264/647, 264/659; 501/97

[56] References Cited

U.S. PATENT DOCUMENTS

| | | | |
|---|---|---|---|
| 4,351,787 | 9/1982 | Martinengo et al. | 264/65 |
| 5,055,432 | 10/1991 | Edler et al. | 501/97 |
| 5,166,106 | 11/1992 | Edler et al. | 501/98 |
| 5,204,297 | 4/1993 | Yamamoto et al. | 501/97 |
| 5,275,772 | 1/1994 | Yamamoto et al. | 264/65 |
| 5,387,562 | 2/1995 | Dillinger et al. | 501/97 |
| 5,468,696 | 11/1995 | Ishizawa et al. | 501/98 |
| 5,672,553 | 9/1997 | Mitomo et al. | 501/97 |
| 5,756,411 | 5/1998 | Nakahata et al. | 501/97.1 |
| 6,001,759 | 12/1999 | Miyanaga et al. | 501/97.2 |

FOREIGN PATENT DOCUMENTS

| | | |
|---|---|---|
| 63-89462 | 4/1988 | Japan . |
| 4-175268 | 6/1992 | Japan . |
| 4-219371 | 8/1992 | Japan . |
| 6-135771 | 5/1994 | Japan . |
| 7-48174 | 2/1995 | Japan . |
| 7-109176 | 4/1995 | Japan . |
| 7-149588 | 6/1995 | Japan . |
| 7-187793 | 7/1995 | Japan . |
| 7-237971 | 9/1995 | Japan . |
| 8-319187 | 12/1996 | Japan . |
| 9-30866 | 2/1997 | Japan . |
| 9-64235 | 3/1997 | Japan . |

OTHER PUBLICATIONS

"Thermal Properties of HIP Sintered Silicon Nitride", K. Watari, Journal of Ceramics Society of Japan, vol. 97(1989), No. 1, pp. 56–62.

*Primary Examiner*—Daniel J. Jenkins
*Attorney, Agent, or Firm*—McDermott, Will & Emery

[57] ABSTRACT

A high thermal conductive silicon nitride base sintered body which comprises a phase comprising crystal grains of silicon nitride and a grain boundary phase containing a compound of at least one element selected from the group consisting of yttrium and the lanthanide elements in an amount of 1 to 20% by weight in terms of oxide amount, and contains free silicon dispersed therein in an amount of 0.01 to 10% by weight based on the whole. This high thermal conductive silicon nitride base sintered body has high strength coupled with high thermal conductivity and thus is useful not only as various parts for semiconductor devices, such as radiating insulating substrates, but as various structural parts for machines, OA apparatuses, etc.

10 Claims, No Drawings

SILICON NITRIDE SINTER HAVING HIGH THERMAL CONDUCTIVITY AND PROCESS FOR PREPARING THE SAME

TECHNICAL FIELD

This invention relates to an $Si_3N_4$ base sintered body which is useful not only as various parts for use in semiconductor devices, including insulating substrates and various radiating plates, but also as various structural parts for motor vehicles, machines, OA apparatuses, etc. and is excellent in productivity and especially in mechanical strength and radiating properties. This invention also relates to a process for producing the sintered body.

BACKGROUND ART

Ceramics comprising silicon nitride as the main component are superior in heat resistance, mechanical strength, and toughness to other ceramic materials, and are materials suitable for various structural parts such as automotive parts and OA apparatus parts. Attempts are being made to use them as insulating radiating substrates for semiconductor devices, etc. so as to take advantage of their high insulating properties.

Alumina and the like have conventionally been used extensively as ceramic substrates for semiconductors. However, with the trend toward higher speeds, higher degrees of integration, and higher outputs in semiconductor devices, materials having higher thermal conductivity and excellent radiating properties have come to be desired and the application of AlN and SiC has progressed. However, no high thermal conductive substrate has been obtained so far which is made of AlN or the like and is sufficient in strength and toughness, and the current substrates have drawbacks in product handling and shape because of breakage caused by external force, etc. There is hence a desire for the development of a ceramic material combining high-strength properties which enable the material to withstand external force with excellent radiating properties.

Silicon nitride ($Si_3N_4$), which intrinsically has high strength, is expected to be used as insulating radiating substrates if its thermal conductivity can be improved. However, since the conventionally known silicon nitride sintered bodies have lower thermal conductivities than AlN and SiC, they have not been put to practical use as an insulating radiating substrate.

The thermal conductivity of insulating ceramics such as silicon nitride is mainly attributable to the transmission of phonons. Since phonons are scattered by phases having different impedances, such as lattice defects and impurities, present in the sintered body, the thermal conductivity κ is defined by the following numerical formula 1:

$$\kappa = c \times V \times l / 3 \quad \text{(Numerical formula 1)}$$

(wherein c is specific heat capacity; V is average velocity of phonons; and l is the mean free path of phonons).

The specific heat capacity c and the group velocity V in numerical formula 1 each is a number which varies from material to material and can be regarded as almost the same in the same material. Consequently, the thermal conductivity of silicon nitride crystal grains is governed substantially by the mean free path of phonons. For example, when AlN or $Al_2O_3$, which have conventionally been used generally, is added as a sintering aid, then aluminum ions or oxygen ions form a solid solution in $Si_3N_4$ crystal grains and thus scatter phonons, resulting in a reduced thermal conductivity. Because of this, general silicon nitride base sintered bodies to which $Al_2O_3$, AlN, $Y_2O_3$, or the like has been added have a thermal conductivity as low as about 15 W/m·k.

Various investigations have hence been made in order to obtain a silicon nitride base sintered body having a high thermal conductivity. For example, the thermal conductivity of a silicon nitride base sintered body obtained through an HIP treatment after the addition of $Y_2O_3$ and $Al_2O_3$ in combination as a sintering aid is discussed in "Paper Journal of Ceramics Society of Japan)," Vol.97 (1989), No.1, pp.56–62. The result given therein is that the thermal conductivity of the sintered body becomes higher as the proportion of β-form crystal grains increases or as the proportions of $Y_2O_3$ and $Al_2O_3$ in the sintering aid increases and decreases, respectively. There is a description in the paper, section 4.2 to the effect that high thermal conductivity is obtained by β-form crystal grains because β-form crystal grains have a larger mean free path of phonons than α-form crystal grains.

It is therefore important for heightening the thermal conductivity of a silicon nitride base ceramic to accelerate the formation of β-form $Si_3N_4$ crystal grains, to use a rare earth element compound such as $Y_2O_3$, which is regarded as less apt to form a solid solution in the crystal grains, and to diminish the addition of an aluminum compound containing aluminum ions, which are apt to form a solid solution in the crystal grains.

For example, Japanese Patent Laid-Open Nos. 175268/1992 and 219371/1992 show a case in which a dense silicon nitride base sintered body having a thermal conductivity of 40 W/m·k or higher and consisting of β-form $Si_3N_4$ crystal grains was obtained by using a β-form $Si_3N_4$ powder reduced in the contents of oxygen and cationic impurities so as to diminish the amounts of cationic impurities such as aluminum and oxygen, which form a solid solution in $Si_3N_4$ crystal grains, and by additionally adding a compound of, e.g., a Group 4A element when a colored sintered body was to be obtained.

Japanese Patent Laid-Open No. 30866/1997 discloses a dense silicon nitride base sintered body having a thermal conductivity of 80 W/m·k or higher and a flexural strength of 600 MPa or higher which is obtained by adding a compound of an alkaline earth/rare earth element and conducting sintering in high-pressure nitrogen gas at a relatively high temperature around 2,000° C. to thereby heighten the proportion of large β-form crystal grains having a minor diameter of 5 μm or larger.

Japanese Patent Laid-Open Nos. 135771/1994 and 48174/1995 disclose a method for obtaining a dense silicon nitride base sintered body consisting of β-form crystal grains which comprises adding an appropriate amount of aluminum ions together with a rare earth element compound and a Group 4A element compound, without limiting the amount of aluminum ions, and gradually cooling the shape after sintering to thereby accelerate crystallization in the grain boundary phase. There is a description in these patent documents to the effect that an $Si_3N_4$ base sintered body having a flexural strength of 800 MPa or higher and a thermal conductivity of 60 W/m·k or higher is obtained.

On the other hand, Japanese Patent Laid-Open Nos. 149588/1995, 319187/1996, and 64235/1997 disclose: a metallized substrate comprising a silicon nitride base and formed thereon a high-melting metallizing layer made of tungsten or molybdenum; and a semiconductor module comprising the substrate and a conductor circuit bonded thereto. Japanese Patent Laid-Open No. 187793/1995 discloses various semiconductor devices containing a similar metallized substrate and various structural members comprising the same silicon nitride base sintered body. The above high-melting metallizing layer is one formed on the base through an oxide film made of $SiO_2$, a layer of one or more Group 4A metals or of a brazing material containing these, or through a Cu—$Cu_2O$ eutectic layer, and has a peel strength of 3 kgf/mm² or higher.

As described above, it is important in the conventional methods to use a high-purity $Si_3N_4$ powder reduced in the contents of oxygen and cationic impurities and to add an appropriate kind of sintering aid in an appropriate amount in order to inhibit oxygen ions and cationic impurities from forming a solid solution in crystal grains. Namely, in order to obtain crystal grains in which impurities or defects have been diminished, the purity of the grains should be increased by using expensive high-purity powder feedstocks as the main and minor ingredients and causing grain growth at a high temperature and a high pressure. For example, as described in Japanese Patent Laid-Open No. 30866/1997, cited above, it is necessary to employ a method in which high-purity β-form silicon nitride is used as a feedstock powder and grain growth is caused at a high temperature and a high pressure (2,000° C., 300 atm).

DISCLOSURE OF INVENTION

As described above, improvements for obtaining a silicon nitride base sintered body having high strength and high thermal conductivity have hitherto been made by properly controlling a feedstock powder and a sintering aid. However, merely selecting a proper feedstock powder and a proper sintering aid not only results in increased feedstock and process costs but also is limited in further improving the thermal conductivity of a silicon nitride base sintered body.

There is hence a desire for another means for further reducing the amount of impurities, especially the amount of oxygen, contained in $Si_3N_4$ crystal grains. However, it is not easy to inexpensively obtain a silicon nitride powder reduced in oxygen content. In addition, since general silicon nitride powders on the market have an oxygen content of at least 0.7 to 1.0% by weight, the thermal conductivities of the silicon nitride base sintered bodies obtained from such inexpensive commercial powder feedstocks have been limited to about 70 W/m·k.

Even when a high-purity β-form silicon nitride powder having a relatively low oxygen content is used, high-temperature high-pressure sintering is necessary for obtaining high thermal conductivity. This method is therefore inferior in productivity because of exceedingly high feedstock and production costs, etc., and is disadvantageous in that the sintered body is apt to have a reduced strength and poor suitability for practical use since the treatment conducted at a temperature as high as around 2,000° C. is accompanied with considerable grain growth.

In view of such prior art circumstances, an object of this invention is to provide a silicon nitride base sintered body having excellent productivity and high strength and simultaneously having high thermal conductivity not possessed by any conventional silicon nitride base sintered body and to provide a process for producing the sintered body.

The silicon nitride base sintered body provided by this invention in order to accomplish the above object is characterized by comprising a phase comprising crystal grains of β-form silicon nitride and a grain boundary phase containing a compound of at least one element selected from the group consisting of yttrium and the lanthanide elements in an amount of 1 to 20% by weight in terms of oxide amount, and by containing free silicon dispersed in the crystal grains of silicon nitride in an amount of 0.01 to 10% by weight based on the whole. The sintered body combines high strength and high thermal conductivity. As used herein throughout the specification and claims, the expression "lanthanide elements" is intended to include elements of atomic numbers 57 through 71.

The high thermal conductive silicon nitride base sintered body of this invention can contain a compound of at least one element selected among the Group 4A elements in an amount of 0.01 to 3% by weight in terms of element amount and/or contain a compound of at least one element selected from the group consisting of calcium and lithium in an amount of 0.1 to 5% by weight in terms of oxide amount. In this high thermal conductive silicon nitride base sintered body, the amount of oxygen contained in the crystal grains of silicon nitride is preferably 0.6% by weight or smaller.

The process for producing the above-described high thermal conductive silicon nitride base sintered body of this invention is characterized by comprising: a mixing step in which a silicon powder in an amount of 99 to 80% by weight in terms of $Si_3N_4$ is mixed with 1 to 20% by weight powder of a compound of at least one element selected from the group consisting of yttrium and the lanthanide elements; a molding step in which the powder mixture is molded; a nitriding step in which the resultant compact is heated in an atmosphere containing nitrogen at 1,200 to 1,400° C. to nitride the same until the amount of free silicon is reduced to 0.01 to 10% by weight based on the whole; and a sintering step in which the nitrided body is sintered by heating in an atmosphere containing nitrogen at 1,600 to 2,000° C.

In the nitriding step in the process of this invention, the compact is preferably heated at a rate of 0.3 to 0.5° C./min in the temperature range of from 1,200 to 1,300° C. and then heated in the temperature range of from 1,300 to 1,400° C. In the mixing step, it is preferred to add a powder of a compound of at least one element selected among the Group 4A elements or use a feedstock powder containing the Group 4A element so that the amount of the Group 4A element is 0.01 to 3% by weight based on the whole. Furthermore, a powder of a compound of at least one element selected between lithium and calcium can be added in an amount of 1 to 5% by weight in terms of oxide amount based on the whole.

BEST MODE FOR CARRYING OUT THE INVENTION

In this invention, it has become possible to obtain defect-free high-purity $Si_3N_4$ crystal grains by a new method in which a silicon powder which can be easily available with a high-purity is used as the main feedstock powder and nitrided into $Si_3N_4$ while leaving an adequate amount of free silicon. Hence, an inexpensive silicon nitride base sintered body combining high thermal conductivity with mechanical strength can be obtained.

Namely, in the process of this invention, a silicon feedstock powder is mixed with 1 to 20% by weight compound of at least one rare earth element selected from the group consisting of yttrium and the lanthanide elements, and a compact of the resultant mixture is nitrided at 1,200 to 1,400° C. to obtain a nitrided body comprising high-purity $Si_3N_4$ crystal grains containing 0.05 to 10% by weight free silicon. Thereafter, this nitrided body is sintered at 1,600 to 2,000 C. to thereby obtain a silicon nitride base sintered body having high strength and high thermal conductivity.

Compared especially to the case where nitrided bodies are produced from $Si_3N_4$, powders obtained through a pulverization step, such as commercial ready-made nitrided $Si_3N_4$ powders, the process of this invention can yield a nitrided body comprising $Si_3N_4$ crystal grains reduced in defects such as dislocations. Furthermore, due to the nitriding method in which free silicon is left in the nitrided body, an increase in the purity. of the $Si_3N_4$ crystal grains (diminution of oxygen and defects) in the subsequent sintering step can be easily attained. As a result, a silicon nitride base sintered body having a greatly improved thermal conductivity and a high strength is obtained.

The high thermal conductive silicon nitride base sintered body of this invention is constituted substantially of β-form silicon nitride and 0.01 to 10% by weight free silicon finely dispersed in crystal grains of the silicon nitride, and contains as a grain boundary phase at least one rare earth element in an amount of 1 to 20% by weight in terms of oxide amount.

The amount of the free silicon dispersed in the silicon nitride crystal grains is 0.01 to 10% by weight, preferably 0.01 to 5% by weight, based on the whole sintered body. The dispersed silicon particles are desirably fine particles specifically having a maximum diameter of 3 μm or smaller. If the amount of the dispersed silicon particles is below 0.01% by weight, the sintered body has reduced thermal conductivity. If the amount thereof exceeds 10% by weight, the sintered body has reduced flexural strength and reduced heat resistance. The reason why the silicon nitride grains should be β-form is that the β-form is reduced in crystal strain and in phonon scattering as compared with the α-form and hence has excellent thermal conductivity.

The grain boundary phase contains a compound of at least one rare earth element selected from the group consisting of yttrium and the lanthanide elements, and its content is 1 to 20% by weight in terms of oxide amount based on the whole sintered body. If the content of the compound is below 1% by weight, the nitriding reaction proceeds insufficiently, making it difficult to regulate the amount of free silicon to a target value. If the content thereof exceeds 20% by weight, a liquid phase is present in excess during sintering, resulting in a sintered body reduced in both thermal conductivity and flexural strength. Either case is hence undesirable. Especially preferred rare earth elements are those having an ionic field strength [(valence/(ionic radius)$^2$] of 0.54 or higher, e.g., samarium, yttrium, ytterbium, gadolinium, dysprosium, and erbium.

The grain boundary phase can contain a compound of at least one element selected among the Group 4A elements, besides the rare earth element compound. Due to the addition of at least one Group 4A element compound, the thermal conductivity of the sintered body can be further improved. This is because the Group 4A element compound is thought to function to enable the yielded $Si_3N_4$ crystal grains to be considerably reduced in impurity amount and in the amount of crystal strain attributable to impurities. The content of Group 4A element compounds is preferably 0.01 to 3% by weight in terms of element amount based on the whole. If the content thereof is below 0.01% by weight, the effect of further heightening thermal conductivity cannot be obtained. If the content thereof exceeds 3% by weight, there are cases where a mechanical strength sufficient for practical use cannot be obtained.

The grain boundary phase may contain at least one element selected from the group consisting of calcium and lithium in an amount of 0.1 to 5% by weight in terms of its oxide. These elements improve suitability for sintering and contribute to densification in low-temperature sintering. The reason for the above amount range is that calcium or lithium contents below 0.1% by weight are ineffective in improving suitability for sintering, while contents thereof exceeding 5% by weight result in a sintered body reduced in mechanical strength.

The amount of oxygen contained in the $Si_3N_4$ crystal grains in the silicon nitride base sintered body is desirably 0.6% by weight or smaller, preferably 0.3% by weight or smaller. By reducing the oxygen amount to such a low value, even higher thermal conductivity can be stably obtained.

The process for producing a silicon nitride base sintered body of this invention is explained next. First, in the mixing step in the process of this invention, a weighed amount of a silicon powder as the main ingredient is mixed with a weighed amount of a powder of a compound of at least one rare earth element selected from the group consisting of yttrium and the lanthanide elements as a minor ingredient. The amount of the silicon powder is 99 to 80% by weight in terms of $Si_3N_4$, while that of the minor ingredient powder is 1 to 20% by weight in terms of oxide amount. The mixing may be conducted by a known method.

The silicon powder for use as the main ingredient has an intraparticulate oxygen content(oxygen content in silicon particles) of desirably 0.6% by weight or lower, preferably 0.3% by weight or lower. This is because if a silicon powder having an intraparticulate oxygen content exceeding 0.6% by weight is used, the oxygen content in the $Si_3N_4$ crystal grains obtained through the later nitriding step increases and such an increased oxygen content becomes an obstacle to higher thermal conductivity. The average particle diameter of the silicon powder is desirably 20 μm or smaller, preferably 5 μm or smaller. This is because if the average particle diameter thereof exceeds 20 μm, there is a possibility that nitriding might proceed insufficiently in the nitriding step.

The kind and proportion of the minor ingredients which respectively are within the ranges specified above are intended to enable the target $Si_3N_4$ base sintered body to have a structure containing free silicon finely dispersed therein in an amount of 0.01 to 10% by weight and to thereby have an improved strength and improved thermal conductivity. In particular, when a compound of an element having a high ionic field strength (0.54 or higher), e.g., yttrium, samarium, or ytterbium, is added, the element combines with free oxygen ions in the $SiO_2$ film present on the silicon powder surface to inhibit the oxygen from forming a solid solution in the $Si_3N_4$ crystal grains. The addition of such a compound is hence preferred for enhancing thermal conductivity. If the total amount of the minor ingredient is below 1% by weight, the nitriding reaction does not proceed sufficiently and unnitrided silicon remains in excess. The resultant silicon agglomerates serve as sites from which breakage occurs, resulting in considerably reduced strength properties. If the amount thereof exceeds 10% by weight, a grain boundary phase is formed in an excess amount, resulting in a reduced strength and reduced thermal conductivity.

Besides these powders of the main and minor ingredients, a compound of at least one Group 4A element, e.g., titanium, zirconium, or hafnium, may be optionally incorporated in an amount of 0.01 to 3% by weight in terms of element amount based on the whole, by adding a powder of the compound or using a feedstock containing the compound as an impurity. These Group 4A elements are effective in improving thermal conductivity as long as they are used in an amount within the above range.

It is also possible to add a powder of a compound of lithium and/or calcium, especially of the oxide(s), in an amount of 0.1 to 5% by weight based on the whole. This addition can improve the sintering properties without influencing thermal conductivity, and is especially effective in strength enhancement through low-temperature sintering. Lithium does not form a solid solution in $Si_3N_4$ crystal grains because it volatilizes during sintering, while calcium also is less apt to form a solid solution in the crystal grains because it has a large ionic radius. Consequently, the sintered body can retain the excellent thermal conductivity.

In the molding step as the second step, the mixed feedstock powder obtained is molded to obtain a compact in a given shape. An ordinary molding method can be used, such as the generally used mold pressing method or sheet forming method.

The nitriding step as the third step in this invention is conducted in a nitrogen atmosphere at 1,200 to 1,400° C. Nitriding temperatures below 1,200° C. are undesirable in that the reaction rate is considerably low, resulting in a sintered body having reduced mechanical properties. In contrast, nitriding temperatures exceeding 1,400° C. are undesirable in that since the compact is partly heated to or above the melting point of silicon, silicon melting occurs and the melted silicon remains as coarse unnitrided agglomerates, resulting in a sintered body having reduced mechanical properties.

In this nitriding step, the compact is preferably heated at a rate of 0.3 to 0.5° C./min in the temperature range of especially from 1,200 to 1,300° C. and then heat-treated in the temperature range of from 1,300 to 1,400° C. This is because thus controlling the heating rate is suitable for regulating the free silicon remaining unnitrided so as to be present in a desirable dispersed state and in a desirable amount. If too high a heating rate is used, free silicon forms coarse agglomerates due to the heat generated by the reaction and is hence less apt to come into the desired, evenly and finely dispersed state. If the heating rate is lower than the lower limit, impurities are apt to form a solid solution in the $Si_3N_4$ crystal grains being yielded.

In the sintering step as the final step, the nitrided compact which has undergone the nitriding step is sintered in a nitrogen atmosphere at 1,600 to 2,000° C. If the sintering temperature is below 1,600° C., the resultant sintered body has an increased porosity and hence a reduced thermal conductivity. Conversely, sintering temperatures exceeding 2,000° C. are undesirable in that the $Si_3N_4$ is apt to decompose. Especially in the case where sintering is conducted at ordinary pressure, a temperature of 1,800° C. or lower is desirably used. It is also preferred to place the nitrided body in a vessel made of carbon or to use a furnace whose inner wall is made of carbon, in order to prevent external oxygen inclusion. The nitrogen atmospheres for use in the nitriding step and sintering step may contain ammonia gas or other inert gases, besides nitrogen.

In this sintering step, the $Si_3N_4$ grains in the nitrided body change from the α-form to the β-form to thereby form a network structure comprising densified columnar crystal grains. In the process of this invention, a dense, high thermal conductive silicon nitride base sintered body can be obtained usually through sintering at 1,700 to 1,900° C. in a nitrogen atmosphere having a pressure of about 1 to 5 atm. Unlike conventional sintering steps, the sintering in this process need not be conducted, for example, at a temperature as high as about 2,000° C. and a pressure as high as 100 atm or higher.

The silicon nitride base sintered body obtained by the above-described process of this invention has high thermal conductivity together with excellent mechanical strength. Specifically, a silicon nitride base sintered body having a relative density of 95% or higher, a thermal conductivity of 50 W/m·k or higher, and a flexural strength of 600 MPa or higher can be provided by the inexpensive production process.

EXAMPLES

Example 1

Various silicon powders having the intraparticulate oxygen contents and average particle diameters shown in the following Table 1 and an $Sm_2O_3$ power having an average particle diameter of 0.5 μm were prepared. Each silicon powder and the $Sm_2O_3$ powder were weighed out in such respective amounts that the silicon powder amount in terms of $Si_3N_4$ is shown in Table 1 and the $Sm_2O_3$ powder accounted for the remainder. The two powders were mixed with each other in ethyl alcohol by means of a ball mill. The resultant slurry was dried and granulated with a spray dryer to obtain a granular powder mixture having an average particle diameter of about 100 μm.

TABLE 1

| Sample | Silicon powder | | | Amount Of $Sm_2O_3$ Powder (wt %) |
|---|---|---|---|---|
| | Particle diameter (μm) | Oxygen content (wt %) | Amount (wt %) | |
| 1* | 0.05 | 1.0 | 90 | 10 |
| 2 | 1 | 0.6 | 90 | 10 |
| 3 | 5 | 0.4 | 90 | 10 |
| 4 | 10 | 0.3 | 90 | 10 |
| 5 | 20 | 0.3 | 90 | 10 |
| 6 | 25 | 0.3 | 90 | 10 |
| 7* | 25 | 1.0 | 90 | 10 |
| 8* | 5 | 0.4 | 78 | 22 |
| 9 | 5 | 0.4 | 60 | 20 |
| 10 | 5 | 0.4 | 90 | 10 |
| 11 | 5 | 0.4 | 99 | 1 |
| 12* | 5 | 0.4 | 99.5 | 0.5 |

(Note)
The asterisked samples in the table are comparative examples.

Each granular powder mixture was molded by dry pressing into test pieces in two forms, i.e., test pieces having a length of 45 mm, a width of 8 mm, and a thickness of 5 mm (for flexural strength measurement) and ones having an diameter of 12.5 mm and a thickness of 5 mm (for thermal conductivity measurement). Thereafter, these compacts were placed in a refractory case made of carbon and lined with BN, nitrided in 1-atm nitrogen gas at 1,300° C. for 3 hours, and successively heated to 1,850° C. to conduct 3-hour sintering in 4-atom nitrogen gas.

As a result of X-ray diffractometry, all $Si_3N_4$ crystal grains in each sintered body obtained were ascertained to be β-form. The two kinds of test pieces for each sintered body were examined for relative density (proportion of the found density value measured by the Archimedes method to the theoretical density) and for three-point flexural strength and thermal conductivity (laser flash method). Furthermore, the amount of oxygen contained in the $Si_3N_4$ crystal grains was ascertained by Auger electron spectroscopy or the XPS method. With respect to the nitrided compacts which had undergone the nitriding step and the sintered bodies obtained after the sintering step, the amount of free silicon was ascertained by EPMA or Auger electron spectroscopy. In each sample, the maximum diameter of the silicon particles was about 0.8 μm. The results of the above examinations are shown in the following Table 2.

TABLE 2

| Sample | Silicon amount in nitrided body (wt %) | Si₃N₄ sintered body | | | | |
|---|---|---|---|---|---|---|
| | | Density (%) | Flexural strength (MPa) | Thermal Conductivity (W/mK) | Silicon Amount (wt %) | Oxygen amount (wt %) |
| 1* | <0.01 | 99 | 1000 | 40 | <0.01 | 1.0 |
| 2 | 0.5 | 99 | 1000 | 85 | 0.5 | 0.4 |
| 3 | 2.0 | 99 | 900 | 90 | 2.0 | 0.3 |
| 4 | 4.0 | 97 | 800 | 92 | 4.0 | 0.2 |
| 5 | 7.0 | 90 | 700 | 80 | 8.0 | 0.3 |
| 6 | 8.0 | 89 | 500 | 70 | 8.0 | 0.3 |
| 7* | 15 | 80 | 400 | 40 | 15 | 1.0 |
| 8* | <0.01 | 80 | 500 | 45 | <0.01 | 0.7 |
| 9 | 0.1 | 99 | 850 | 80 | 0.1 | 0.3 |
| 10 | 1.0 | 99 | 900 | 90 | 1.0 | 0.3 |
| 11 | 10 | 80 | 600 | 70 | 10 | 0.4 |
| 12* | 20 | 70 | 400 | 40 | 20 | 0.8 |

(Note)
The asterisked samples in the table are comparative examples.

The above results show the following. The content of silicon in β-form Si₃N₄ crystal grains obtained after sintering can be regulated within the range of 0.01 to 10% by weight and a high thermal conductive Si₃N₄ base sintered body having a three-point flexural strength of 600 MPa or higher and a thermal conductivity of 50 W/m·k or higher is obtained by using a silicon feedstock power having an oxygen content of 1% by weight or lower adding a rare earth oxide (Sm₂O₃) powder as a minor ingredient in an amount of 1 to 20% by weight, and nitriding the mixture of both in a nitrogen atmosphere at 1,200 to 1,400° C.

Example 2

The same feedstock powders as those used for sample 3 in Example 1 were used in the same proportion to likewise prepare compacts in the given shapes. The compacts were nitrided for 3 hours in 1-atm nitrogen gas at each of the nitriding temperatures shown in the following Table 3. In this nitriding, some of the samples were regulated with respect to heating rate in the temperature range of from 1,200 to 1,300° C. as shown in Table 3. Thereafter, the nitrided bodies were sintered for 3 hours in 4-atm nitrogen gas at each of the sintering temperatures shown in Table 3. The Si₃N₄ base sintered body samples obtained were evaluated in the same manner as in Example 1. The results of the evaluations are shown in the following Table 4.

TABLE 3

| Sample | Nitriding Conditions | | Silicon amount in nitrided body (wt %) | Sintering conditions (° C. xhr) |
|---|---|---|---|---|
| | Heating rate (° C./min) | Nitriding Treatment (° C. xhr) | | |
| 13 | 0.3 | 1300 × 3 | 0.5 | 1850 × 3 |
| 14 | 0.5 | 1300 × 3 | 1.2 | 1850 × 3 |
| 15 | 0.7 | 1300 × 3 | 1.5 | 1850 × 3 |
| 16* | — | 1180 × 3 | 30 | 1850 × 3 |
| 17* | — | 1200 × 3 | 20 | 1850 × 3 |
| 18 | 0.4 | 1300 × 3 | 1.0 | 1850 × 3 |
| 19 | 0.4 | 1400 × 3 | 0.3 | 1850 × 3 |
| 20* | 0.4 | 1420 × 3 | 5.0 | 1850 × 3 |
| 21* | 0.4 | 1300 × 3 | 1.0 | 1580 × 3 |
| 22 | 0.4 | 1300 × 3 | 1.0 | 1600 × 3 |
| 23 | 0.4 | 1300 × 3 | 1.0 | 1700 × 3 |
| 24 | 0.4 | 1300 × 3 | 1.0 | 1800 × 3 |
| 25 | 0.4 | 1300 × 3 | 1.0 | 1900 × 3 |
| 26 | 0.4 | 1300 × 3 | 1.0 | 2000 × 3 |
| 27* | 0.4 | 1300 × 3 | 1.0 | 2200 × 3 |

(Note)
The asterisked samples in the table are comparative examples.

TABLE 4

| Sample | Si₃N₄ sintered body | | | | |
|---|---|---|---|---|---|
| | Density (%) | Flexural Strength (MPa) | Thermal conductivity (W/mK) | Silicon amount (wt %) | Oxygen amount (wt %) |
| 13 | 99 | 950 | 110 | 0.5 | 0.2 |
| 14 | 99 | 900 | 110 | 1.2 | 0.2 |
| 15 | 99 | 900 | 92 | 1.5 | 0.3 |
| 16* | 75 | 350 | 50 | 20 | 0.7 |
| 17* | 80 | 500 | 55 | 10 | 0.7 |
| 18 | 99 | 1000 | 120 | 1.0 | 0.15 |
| 19 | 99 | 1100 | 110 | 0.3 | 0.2 |
| 20* | 90 | 400 | 70 | 5 | 0.6 |
| 21* | 70 | 550 | 50 | 1.0 | 0.3 |
| 22 | 90 | 850 | 90 | 1.0 | 0.2 |
| 23 | 98 | 900 | 100 | 1.0 | 0.2 |
| 24 | 99 | 1000 | 115 | 1.0 | 0.15 |
| 25 | 99 | 1100 | 115 | 1.0 | 0.15 |
| 26 | 95 | 900 | 95 | 1.0 | 0.2 |
| 27* | 85 | 500 | 80 | 1.0 | 0.4 |

(Note)
The asterisked samples in the table are comparative examples.

The above results show that by using a nitriding temperature of 1,200 to 1,400° C., the Si₃N₄ crystal grains in the resultant nitrided body include therein silicon in a content range of from 0.01 to 10% by weight. The results further show that by sintering the nitrided body at 1,600 to 2,000° C., a high thermal conductive Si₃N₄ base sintered body can be obtained in which the silicon content in the Si₃N₄ crystal grains is in the range of 0.01 to 10% by weight and which has a three-point flexural strength of 600 MPa or higher and a thermal conductivity of 50 W/m·k or higher. The results furthermore show that by regulating the heating rate in the temperature range of from 1,200 to 1,300° C. during nitriding to 0.3 to 0.5° C./min, sintered bodies even more improved in three-point flexural strength and thermal conductivity can be obtained.

Example 3

Powder mixtures were prepared using the same silicon powder and Sm₂O₃ powder as those for sample 4 in Example 1 in such a manner that the silicon powder was used in an amount of 90% by weight and part of the 10% by weight Sm₂O₃ powder as the remainder was replaced with each of the substitute compound powders shown in the following Table 5. Using each of the powder mixtures, compacts were prepared in the same manner as Example 1. The compacts were nitrided under the same conditions as those for sample 15 in Example 2 and then sintered for 3 hours in 5-atm nitrogen gas respectively at the sintering temperatures shown in Table 5. The sintered bodies obtained were evaluated in the same manner as in Example 1. The results of the evaluations are shown in the following Table 6.

TABLE 5

| | Substitute compound | | Nitrided body | |
|---|---|---|---|---|
| | Powder | | Silicon | Sintering |
| Sample | Kind of the compound | Amount (wt %) | Amount (wt %) | Temperature (° C.) |
| 28 | TiN | 0.005 | 1.5 | 1800 |
| 29 | TiN | 0.01 | 1.5 | 1800 |
| 30 | TiN | 0.1 | 1.5 | 1800 |
| 31 | TiN | 1 | 2.0 | 1800 |
| 32 | TiN | 3 | 4.0 | 1800 |
| 33 | TiN | 4 | 12.0 | 1800 |
| 34 | ZrC | 1 | 2.0 | 1800 |
| 35 | CaO | 0.08 | 1.5 | 1800 |
| 36 | CaO | 0.1 | 1.5 | 1750 |
| 37 | CaO | 2 | 1.5 | 1650 |
| 38 | CaO | 5 | 2.0 | 1620 |
| 39 | CaO | 6 | 10.0 | 1600 |
| 40 | Li$_2$O | 0.08 | 1.5 | 1750 |
| 41 | Li$_2$O | 0.1 | 1.5 | 1700 |
| 42 | Li$_2$O | 2 | 1.5 | 1650 |
| 43 | Li$_2$O | 6 | 6.0 | 1630 |

(Note)
The asterisked samples in the table are comparative examples.

TABLE 6

| | Si$_3$N$_4$ sintered body | | | | |
|---|---|---|---|---|---|
| Sample | Density (%) | Flexural Strength (MPa) | Thermal conductivity (W/mK) | Silicon amount (wt %) | Oxygen amount (wt %) |
| 28 | 99 | 900 | 92 | 1.5 | 0.2 |
| 29 | 99 | 900 | 105 | 1.5 | 0.15 |
| 30 | 99 | 900 | 110 | 1.5 | 0.15 |
| 31 | 99 | 900 | 120 | 2.0 | 0.15 |
| 32 | 98 | 800 | 105 | 4.0 | 0.15 |
| 33 | 90 | 500 | 90 | 10.0 | 0.2 |
| 34 | 99 | 800 | 105 | 2.0 | 0.2 |
| 35 | 99 | 900 | 90 | 1.5 | 0.2 |
| 36 | 99 | 1100 | 90 | 1.5 | 0.2 |
| 37 | 99 | 1000 | 90 | 1.5 | 0.2 |
| 38 | 98 | 900 | 85 | 2.0 | 0.3 |
| 39 | 85 | 600 | 60 | 8.0 | 0.6 |
| 40 | 99 | 800 | 90 | 1.5 | 0.3 |
| 41 | 99 | 950 | 90 | 1.5 | 0.3 |
| 42 | 99 | 920 | 90 | 1.5. | 0.3 |
| 43 | 80 | 450 | 60 | 6.0 | 0.3 |

The above results show that the addition of a Group 4A element compound in an amount of 0.01 to 3% by weight in terms of element amount is effective in obtaining a sintered body having an even more improved thermal conductivity while retaining the high flexural strength. The results further show that the addition of a calcium or lithium compound in an amount of 0.1 to 5% weight in terms of oxide amount is effective in improving the sinterability and in thus enabling low-temperature densification. The results furthermore show that although the addition of these ingredients is effective, it leads to a decrease in the strength of a sintered body when the amount of the Group 4A element exceeds 3% by weight or that of the calcium or lithium compound exceeds 5% by weight.

Example 4

A silicon powder having an average particle diameter of 1 μm and an intraparticulate oxygen content of 0.5% by weight and the rare earth element compound powders described in the following Table 7 which each had an average particle diameter of 0.5 μm were prepared. The silicon powder and each rare earth element compound powder were weighed out so that the silicon powder amount in terms of Si$_3$N$_4$ was 90% by weight and the other powder accounted for the remainder, i.e., 10% by weight. Powder mixtures were prepared in the same manner as in Example 1. Thereafter, each powder mixture was molded into compacts in the two forms in the same manner as in Example 1. The resultant shapes were placed in a refractory case made of carbon and lined with Si$_3$N$_4$, and then nitrided and sintered under the same conditions as in Example 1.

X-ray diffractometry revealed that all the Si$_3$N$_4$ crystal grains in each of the sintered bodies obtained were β-form. The sintered bodies each had a relative density of 98 to 99%. Each sintered body was evaluated for silicon amount and oxygen amount in the crystal grains and for three-point flexural strength and thermal conductivity by the same methods as in Example 1. The results of the evaluations are shown in Table 7. The results show that the addition of a rare earth element having a field strength [valence/(ionic radius)$^2$] of 0.54 or higher is effective in obtaining an even higher thermal conductivity.

TABLE 7

| | Rare earth compound powder | | Si$_3$N$_4$ sintered body | | | |
|---|---|---|---|---|---|---|
| | | | | Thermal | | |
| Sample | Kind of the Compound | Field strength of the element | Flexural strength (MPa) | Conductivity (W/mk) | Silicon amount (wt %) | Oxygen amount (wt %) |
| 44 | La$_2$O$_3$ | 0.507 | 700 | 60 | 1.8 | 0.6 |
| 45 | CeO$_2$ | 0.517 | 750 | 65 | 2.2 | 0.6 |
| 46 | Nd$_2$O$_3$ | 0.528 | 800 | 60 | 2.1 | 0.6 |
| 47 | Sm$_2$O$_3$ | 0.540 | 1000 | 90 | 0.5 | 0.4 |
| 48 | Y$_2$O$_3$ | 0.567 | 800 | 85 | 2.0 | 0.3 |
| 49 | Yb$_2$O$_3$ | 0.583 | 1000 | 105 | 1.0 | 0.2 |

Example 5

Silicon powders respectively having the intraparticulate oxygen contents shown in the following Table 8 and powders of the rare earth element compounds shown in Table 8 which each had an average particle diameter of 0.5 μm were prepared. Each silicon powder each rare earth element compound powder were weighed out so that the silicon powder amount in terms of Si$_3$N$_4$ was 90% by weight and the other powder accounted for the remainder, i.e., 10% by weight. Granular powder mixtures were prepared in the same manner as in Example 1. Thereafter, each granular powder mixture was nitrided and sintered under the same conditions as those for sample 18 in Example 2. The sintered bodies obtained were evaluated in the same manner as in Example 1. The results of the evaluations are shown in Table 8. The results show that the lower the intraparticulate oxygen content of the starting silicon powder, the higher the thermal conductivity of the Si$_3$N$_4$ sintered body obtained.

TABLE 8

| Sample | Oxygen content of Silicon powder (wt %) | Rare earth compound | $Si_3N_4$ sintered body | | | |
|---|---|---|---|---|---|---|
| | | | Flexural strength (MPa) | Thermal conductivity (W/mk) | Silicon Amount (wt %) | Oxygen amount (wt %) |
| 50 | 0.2 | $La_2O_3$ | 700 | 90 | 1.5 | 0.3 |
| 51 | 0.2 | $Sm_2O_3$ | 900 | 130 | 1.0 | 0.1 |
| 52 | 0.3 | $Yb_2O_3$ | 1100 | 120 | 0.5 | 0.15 |
| 53 | 0.1 | $Yb_2O_3$ | 1000 | 130 | 0.5 | 0.1 |

INDUSTRIAL APPLICABILITY

According to this invention, a silicon nitride base sintered body combining high strength with high thermal conductivity not possessed by any conventional silicon nitride base sintered body can be provided by a novel process having excellent productivity by removing or diminishing impurities which can form a solid solution in silicon nitride crystal grains. This high thermal conductive silicon nitride base sintered body is extremely useful not only as various parts for semiconductor devices, such as radiating insulating substrates, but as various structural parts for machines, OA apparatuses, etc.

What is claimed is:

1. A high thermal conductive silicon nitride base sintered body which comprises a phase comprising crystal grains of silicon nitride and a grain boundary phase containing a compound of at least one element selected from the group consisting of yttrium and the lanthanide elements in an amount of 1 to 20% by weight in terms of oxide amount, and contains free silicon dispersed therein in an amount of 0.01 to 10% by weight based on the whole.

2. A high thermal conductive silicon nitride base sintered body as set forth in claim 1, wherein the amount of oxygen contained in the crystal grains of silicon nitride is 0.6% by weight or smaller.

3. A high thermal conductive silicon nitride base sintered body as set forth in claim 1, which contains a compound of at least one element selected among the Group 4A elements in an amount of 0.01 to 3% by weight in terms of element amount.

4. A high thermal conductive silicon nitride base sintered body as set forth in claim 1, which contains a compound of at least either element selected from the group consisting of calcium and lithium in an amount of 0.1 to 5% by weight in terms of oxide amount.

5. A high thermal conductive silicon nitride base sintered body as set forth in claim 1, which has a relative density of 95% or higher, a thermal conductivity of 50 W/m·k or higher, and a flexural strength of 600 MPa or higher.

6. A process for producing a high thermal conductive silicon nitride base sintered body, which comprises: a mixing step in which a silicon powder in an amount of 99 to 80% by weight in terms of $Si_3N_4$ is mixed with 1 to 20% by weight powder of a compound of at least one element selected from the group consisting of yttrium and the lanthanide elements; a molding step in which the powder mixture is molded; a nitriding step in which the resultant compact is heated in an atmosphere containing nitrogen at 1,200 to 1,400° C. to nitride the same until the amount of free silicon is reduced to 0.01 to 10% by weight based on the whole; and a sintering step in which the nitrided body is sintered by heating in an atmosphere containing nitrogen at 1,600 to 2,000° C.

7. A process for producing a high thermal conductive silicon nitride base sintered body as set forth in claim 6, wherein the silicon powder has a content of intraparticulate oxygen of 0.6% by weight or lower.

8. A process for producing a high thermal conductive silicon nitride base sintered body as set forth in claim 6, wherein in the nitriding step, the compact is heated at a rate of 0.3 to 0.5° C./min in the temperature range of from 1,200 to 1,300° C. and then heat-treated in the temperature range of from 1,300 to 1,400° C.

9. A process for producing a high thermal conductive silicon nitride base sintered body as set forth in claim 6, wherein in the mixing step, a powder of a compound of at least one element selected among the Group 4A elements is added or a feedstock powder containing the Group 4A element is used so that the amount of the Group 4A element is 0.01 to 3% by weight based on the whole.

10. A high thermal conductive silicon nitride base sintered body as set forth in claim 6, wherein in the mixing step, a powder of a compound of at least one element selected between lithium and calcium is added in an amount of 1 to 5% by weight in terms of oxide amount based on the whole.

* * * * *